(12) United States Patent  
Maas

(10) Patent No.: US 7,137,768 B2
(45) Date of Patent: Nov. 21, 2006

(54) FASTENER ASSEMBLY

(75) Inventor: Gerald F. Maas, Lebanon, WI (US)

(73) Assignee: Illinois Tool Works Inc, Glenview, IL (US)

(*) Notice: Subject to any disclaimer, the term of this patent is extended or adjusted under 35 U.S.C. 154(b) by 155 days.

(21) Appl. No.: 10/855,050

(22) Filed: May 27, 2004

(65) Prior Publication Data

US 2005/0079034 A1 Apr. 14, 2005

Related U.S. Application Data

(60) Provisional application No. 60/510,387, filed on Oct. 10, 2003.

(51) Int. Cl.
*F16B 21/00* (2006.01)

(52) U.S. Cl. .................. 411/553; 411/107; 411/166; 411/340

(58) Field of Classification Search ............... 411/107, 411/165, 553, 555, 340, 131, 85
See application file for complete search history.

(56) References Cited

U.S. PATENT DOCUMENTS

| | | | | | |
|---|---|---|---|---|---|
| 923,082 | A | * | 5/1909 | Scherer | 411/115 |
| 2,531,348 | A | * | 11/1950 | Amesbury | 24/290 |
| 2,767,609 | A | * | 10/1956 | Cousino | 411/436 |
| 3,540,342 | A | * | 11/1970 | Rudolph | 411/407 |
| 4,077,299 | A | * | 3/1978 | King, Jr. | 411/339 |
| 4,146,073 | A | * | 3/1979 | Lliteras | 81/436 |
| 4,545,697 | A | * | 10/1985 | Verdenne et al. | 403/230 |
| 4,575,295 | A | * | 3/1986 | Rebentisch | 411/85 |
| 4,670,927 | A | * | 6/1987 | Vaughn | 470/9 |
| 4,878,640 | A | * | 11/1989 | Fricker et al. | 248/297.21 |
| 5,142,834 | A | * | 9/1992 | Laclave et al. | 52/208 |
| 5,302,065 | A | * | 4/1994 | Vogg et al. | 411/85 |
| 5,407,311 | A | * | 4/1995 | Goss | 411/171 |
| 5,570,984 | A | * | 11/1996 | Reznikov et al. | 411/551 |
| 5,823,727 | A | * | 10/1998 | Lee | 411/85 |
| 6,086,300 | A | * | 7/2000 | Frohlich | 411/84 |
| 6,406,237 | B1 | * | 6/2002 | Wojciechowski et al. | 411/107 |
| 6,846,140 | B1 | * | 1/2005 | Anderson et al. | 410/104 |
| 6,966,519 | B1 | * | 11/2005 | Salentine et al. | 242/379 |

* cited by examiner

*Primary Examiner*—Katherine Mitchell
(74) *Attorney, Agent, or Firm*—Mark W. Croll; Paul F. Donovan

(57) ABSTRACT

A fastener assembly including a stud and plate combination is disclosed for fastening a first member to a second member. The assembly comprises a stud which includes a shank having a first and a second end. A head extends from the first end of the shank, the head defining a surface which is disposed adjacent to the first end of the shank. A plate has a first and a second face, the plate defining a slot for the reception therein of the head of the stud. The arrangement is such that when the head is inserted through the slot and is rotated relative to the plate, the first face of the plate slidably cooperates with the surface of the head. The head and the plate are configured and adapted in such a manner that when the head is rotated to the plate, the stud is securely fastened to the plate, thereby allowing the first member to be attached to the second member.

20 Claims, 4 Drawing Sheets

FASTENER ASSEMBLY

CROSS REFERENCE TO RELATED APPLICATIONS

This application is a Complete application based on Provisional Patent Application No. 60/510,387 filed Oct. 10th 2003. All of the disclosure of the aforementioned application is incorporated herein by reference.

FIELD OF THE INVENTION

The present invention relates to a stud and plate combination fastener assembly. More specifically, the present invention relates to a stud and plate combination fastener assembly for fastening a first member to a second member.

SUMMARY OF THE INVENTION

According to one aspect of the present invention, there is generally provided a fastener assembly and more particularly a stud and plate fastener combination. The stud is a threaded bolt having a rectangular domed shaped head. A dimple is centered on the top of the head. A hex is provided on the other end of the stud. The mating panel or plate includes an opening or slot adapted to receive the head of the stud. A pair of click features in the form of raised ramps or protrusions are provided on opposite sides of the opening. Also, a dome portion is adapted to receive the dome shaped head of the stud. The dome portion of the plate includes a centering feature or indent for cooperation with the dimple on the head of the stud.

To assemble the stud to the plate, the head is passed through the opening in the plate. Thereafter the stud is rotated such that the head is captured between the click features of the plate. The dimple on the head of the stud and the associated indent in the panel centers the stud for ease of location and helps hold the fastener in place after locking to inhibit movement. The dimple and indent feature also help keep the assembly square to the face of the plate it is assembled to and helps keep the stud locked to the plate. Once assembled, a nut can be attached to the stud to attach the desired components or members together.

The invention is particularly useful for blind fastening assemblies. Another feature is that the stud can be installed from the same side on which the associated nut will be driven. In the prior art, it has often been necessary to insert a stud through the back of the first member. The insertion of the stud through the back of the first member can be difficult. Furthermore, preventing rotation of the stud while fastening the second member onto the stud has also proven to present problems.

According to another aspect of the present invention, there is generally provided a stud and plate combination fastener assembly for fastening a first member to a second member. The assembly comprises a stud which includes a shank having a first and a second end. A head extends from the first end of the shank, the head defining a surface which is disposed adjacent to the first end of the shank. A plate has a first and a second face, the plate defining a slot for the reception therein of the head of the stud. The arrangement is such that when the head is inserted through the slot and is rotated relative to the plate, the first face of the plate slidably cooperates with the surface of the head. The slot has a first and a second extremity and a first and a second side. The surface of the head has a protrusion which is disposed between the head and the first face of the plate when the head is inserted through the slot. In one embodiment, the first face has a bump thereon which cooperates with the protrusion when the head is inserted into the slot and is rotated relative to the plate. The arrangement is such that when the head has been rotated relative to the plate, the protrusion and the bump interact with each other for locking the head relative to the plate so that when the plate has been secured to the first member, fastening of the second member to the shank is permitted. Alternatively, the protrusion on the head simply interacts with the mating face of the plate to lock the fastener relative to the plate.

In another aspect of the present invention, a stud and plate combination fastener assembly for fastening a first member to a second member comprises a stud which includes a shank having a first and a second end. A head extends from the first end of the shank, the head defining a surface which is disposed adjacent to the first end of the shank. A dimple extends centrally from the head for assisting in centering the head. A plate has a first and a second face, the plate defining a slot for the reception therein of the head of the stud. The arrangement is such that when the head is inserted through the slot and is rotated relative to the plate, the first face of the plate slidably cooperates with the surface of the head. The plate defines an indent for the rotatable reception therein of the dimple such that when the head is rotated within the slot, the dimple and the indent cooperate with each other for centralizing the head relative to the slot. The slot has a first and a second extremity and a first and a second side. Also, in one embodiment, the surface of the head has a protrusion which is disposed between the head and the first face of the plate when the head is inserted through the slot. In another embodiment, the first face has a bump thereon which cooperates with the protrusion when the head is inserted into the slot and is rotated relative to the plate. The arrangement is such that when the head has been rotated relative to the plate, the protrusion and the bump interact with each other for locking the head relative to the plate so that when the plate has been secured to the first member, fastening of the second member to the shank is permitted. Alternatively, the protrusion on the head simply interacts with the mating face of the plate to lock the fastener relative to the plate.

It is a feature of the present invention to provide a stud and plate combination fastener assembly for fastening a first member to a second member that overcomes the problems associated with prior devices.

A feature of the present invention is the provision of a stud and plate combination fastener assembly for assisting the fastening of a first member to a second member.

Another feature of the present invention is the provision of a stud and plate combination fastener assembly for fastening a first member to a second member that is reliable in use and that is relatively low in cost.

Yet another feature of the present invention is the provision of a stud and plate combination fastener assembly for fastening a first member to a second member such that when the plate has been secured to the first member, the second member can be attached to the stud without having to thread the stud through the back of the plate or having to secure the stud against rotation thereof.

Other features and advantages of the present invention will be readily apparent to those skilled in the art upon review of the following detailed description of the preferred embodiments, claims and drawings in which like numerals are used to designate like features.

Figure 1:
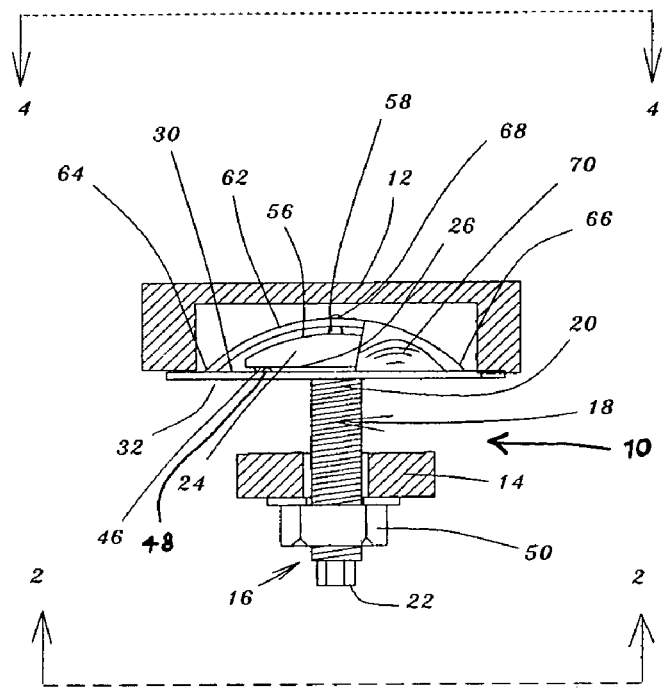
FIG. 1 is a side elevational view partially in section of a stud and plate combination fastener assembly according to the present invention for fastening a first member to a second member.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENTS

FIG. 1 is a side elevational view partially in section of a stud and plate combination fastener assembly generally designated 10 according to the present invention for fastening a first member 12 to a second member 14. As shown in FIG. 1, the first member 12 is located on one side of the fastener device 10 and the second member 14 is located on the opposite side of the fastener device. The fastener device 10 can be secured to the first member 12 in various ways, such as, for example, by welding, adhesives, or other mechanical connections. Alternatively, the fastener device 10 can be positioned on the opposite side of the first member 12 as illustrated in FIG. 1. As further shown in FIG. 1, the device 10 comprises a stud generally designated 16 which includes a shank generally designated 18 having a first and a second end 20 and 22 respectively. A head 24 extends from the first end 20 of the shank 18. The head 24 defines a surface 26 which is disposed adjacent to the first end 20 of the shank 18. A plate generally designated 28 (FIG. 2) has a first and a second face 30 and 32 respectively. In an alternative configuration, the plate 28 forms or is a part of the first member 12. For example, the first member 12 can be a stamped metal part incorporating the structure of the plate 28 as further described below. In this way, the head 24 is adapted to mate directly with the first member 12 in the manner set forth herein.

Figure 2:
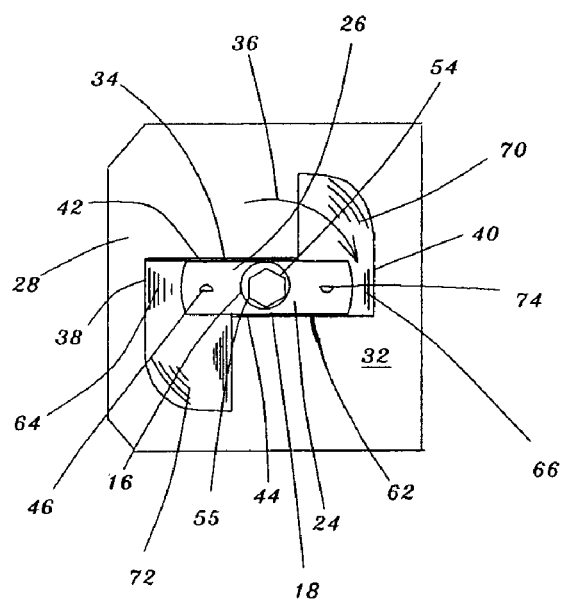
FIG. 2 is a view taken on the line 2—2 of FIG. 1 with certain portions removed for clarity.

FIG. 2 is a view taken on the line 2—2 of FIG. 1 with the members 12 and 14 removed for clarity. However, as explained above, plate 28 could be member 12 in another embodiment. As shown in FIG. 2, the plate 28 defines a slot 34 for the reception therein of the head 24 of the stud 16. The arrangement is such that when the head 24 is inserted through the slot 34 and is rotated relative to the plate 28 as indicated by the arrow 36, the first face 30 of the plate 28 slidably cooperates with the surface 26 of the head 24 as shown in FIG. 1. As shown in FIG. 2, the slot 34 has a first and a second extremity 38 and 40 respectively and a first and a second side 42 and 44 respectively.

Figure 3:
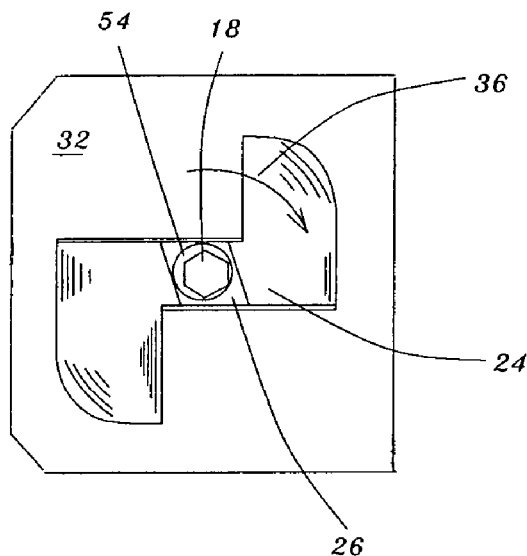
FIG. 3 is a similar view to that shown in FIG. 2 but shows the stud inserted in the slot after being rotated.

FIG. 3 is a similar view to that shown in FIG. 2 but shows the stud 16 inserted in the slot 34 after being rotated. As shown in FIG. 2, the surface 26 of the head 24 has a protrusion 46 which is disposed between the head 24 and the first face 30 of the plate 28 when the head 24 is inserted through the slot 34 as shown in FIGS. 1–3.

Figure 4:
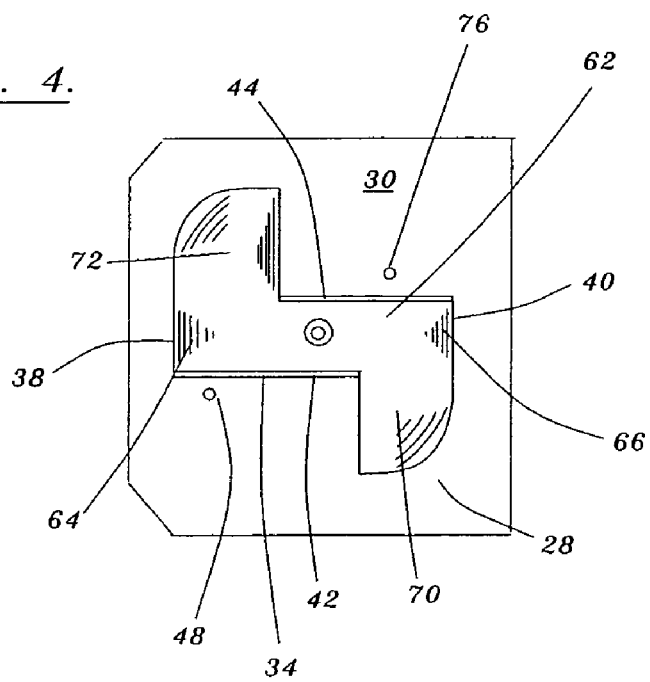
FIG. 4 is a view taken on the line 4—4 of FIG. 1 with certain portions removed for clarity.

FIG. 4 is a view taken on the line 4—4 of FIG. 1 but with the member 12 removed for clarity. As shown in FIG. 4, the first face 30 has a bump 48 thereon which cooperates with the protrusion 46 when the head 24 is inserted into the slot 34 and is rotated as indicated by the arrow 36 relative to the plate 28. The arrangement is such that when the head 24 has been rotated as indicated by the arrow 36 (see FIG. 1) relative to the plate 28, the protrusion 46 and the bump 48 interact with each other for locking the head 24 relative to the plate 28 50 that when the plate 28 has been secured to the first member 12 as shown in FIG. 1, fastening of the second member 14 to the shank 18 is easily permitted. In a preferred embodiment of the present invention as shown in FIGS. 1–4, the shank 18 threadably cooperates with a nut 50 such that the second member 14 can be drawn towards the first member 12 by rotation of the nut 50. However, it will be understood by those skilled in the art that the shank 18 could be non threaded, the shank 18 cooperating with other fasteners or the like, such as, for example, a spring fastener, for securing the second member 14 thereto.

Figure 5:
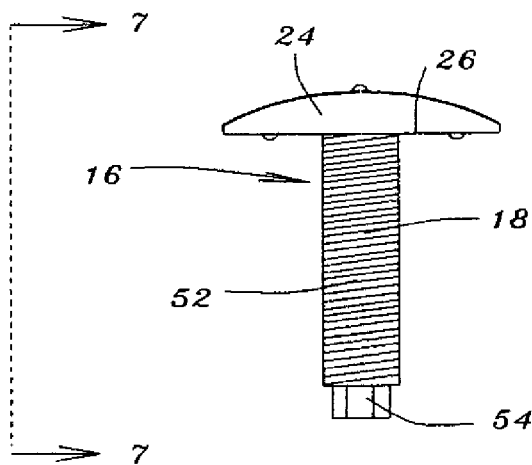
FIG. 5 illustrates the fastener of FIG. 1.

FIG. 5 is a similar view to that shown in FIG. 1 but shows the stud 16 with the plate 28 and members 12 and 14 removed for clarity. As shown in FIG. 5, the shank 18 includes an externally threaded first portion 52, the first portion 52 extending from the surface 26 of the head 24. Also, a second portion 54 extends from the first portion 52 such that the first portion 52 is disposed between the second portion 54 and the surface 26 of the head 24.

Moreover, as also shown in FIGS. 2–3, the second portion 54 defines a hexagonal configuration 55 such that when the head 24 is inserted within the slot 34, rotation of the head 24 as indicated by the arrow 36 is facilitated by the provision of the hexagonal configuration 55 of the second portion 54. In one embodiment of the present invention, as shown in FIGS. 2, 3 and 5, the hexagonal configuration 55 is disposed externally.

Figure 6:
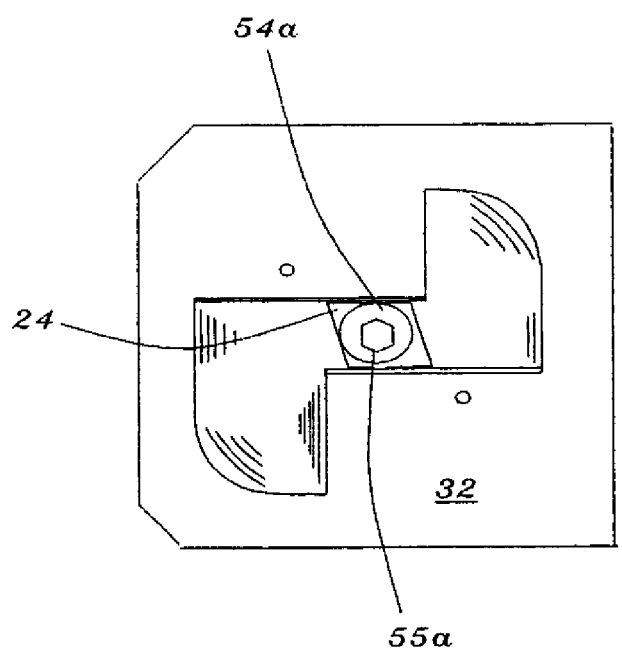
FIG. 6 is an alternative configuration of the device shown in FIG. 3.

FIG. 6 is a similar view to that shown in FIG. 3 but shows a different second portion 54a. As shown in FIG. 6, the hexagonal configuration 55a of the second portion 54a is disposed internally within the second portion 54a.

Figure 7:
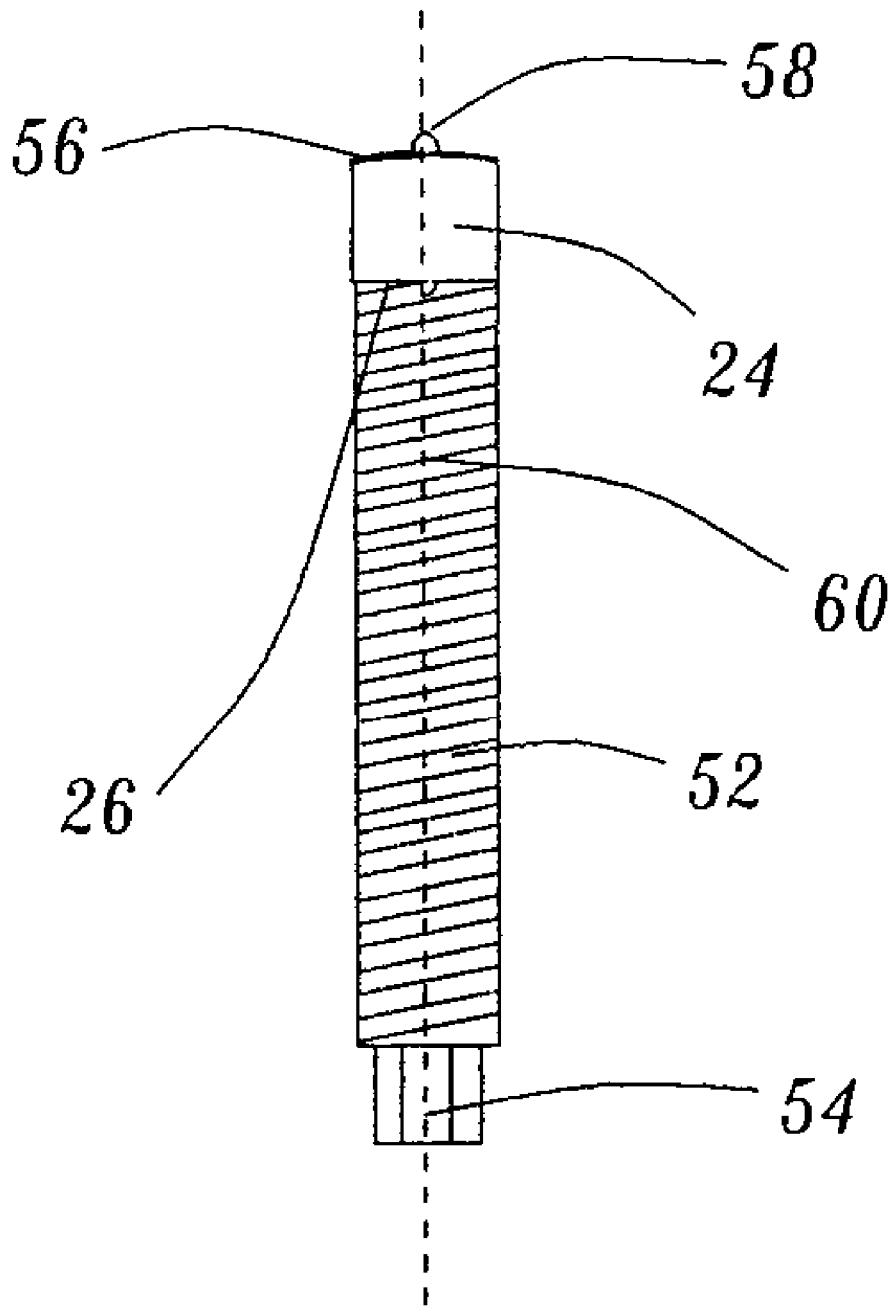
FIG. 7 is a view taken on the line 7—7 of FIG. 5.

FIG. 7 is a view taken on the line 7—7 of FIG. 5. As shown in FIGS. 2, 5 and 7, the head 24 is of a somewhat rectangular configuration. The head 24 defines a further surface 56 which is of a dome shaped configuration as shown particularly in FIGS. 1, 5 and 7. The further surface 56 defines a central dimple 58 which is disposed coaxially relative to a rotational axis 60 of the head 24.

With reference to FIG. 1, the plate 28 further includes a bridge 62 which has a first and a second side 64 and 66 respectively. As shown in FIG. 2, the first side 64 of the bridge 62 extends from the first extremity 38 of the slot 34 and the second side 66 of the bridge 62 extends from the second extremity 40 of the slot 34. The bridge 62 is of dome shaped configuration for the rotatable reception therein of the further surface 56 of the head 24. Furthermore, the bridge 62 defines an indent 68 shown in FIG. 1, such that when the head 24 is inserted into the slot 34 with the further surface 56 of the head 24 cooperating with the dome shaped configuration of the bridge 62, the dimple 58 is located within the indent 68 for centering the head 24 relative to the plate 28.

Preferably, as shown in FIG. 4, the plate 28 further includes a first stop 70 which extends from the first side 42 of the slot 34 for limiting rotation of the head 24 within the slot 34. A second stop 72 which extends from the second side 44 of the slot 34 is provided for also limiting rotation of the head 24 within the slot 34. The first stop 70 is disposed adjacent to the second extremity 40 of the slot 34 and the second stop 72 is disposed adjacent to the first extremity 38 of the slot 34.

Referring back to FIG. 2, the protrusion 46 is preferably a ramp which is of a half-moon shaped configuration.

As also shown in FIG. 2, the surface 26 defines a further protrusion 74 which is disposed on an opposite side of the shank 18 relative to the protrusion 46. As shown in FIG. 4, the first face 30 defines a further bump 76 which is disposed on an opposite side of the slot 34 relative to the bump 48 so that when the head 24 is rotated within the slot 34, the further protrusion 74 and the further bump 76 interact for assisting locking of the head 24 relative to the plate 28.

In operation of the fastener device 10 according to the present invention, the plate 28 is fastened to or formed as a part of the first member 12. The head 24 of the stud 16 is then inserted into the slot 34 and a hex tool (not shown) is used for rotating the stud 16 within the slot 34. Accordingly, the protrusions 46 and 74 interact respectively with the bumps 48 and 76 so that the protrusions act as ramps for urging the dimple 58 into the indent 68 for centralizing the head within the slot 34 for assisting the locking of the head 24 within the plate 28 when the head has been rotated to the position shown in FIG. 3. In a preferred embodiment, the back sides of the protrusions 46 and 74 are preferably flat, vertical surfaces so that once the protrusions 46 and 74 pass over the bumps 48 and 76, rotating the stud 16 in the opposite direction is not undesirably easy to accomplish. After the stud 16 is firmly attached to the plate 28, the second member 14 is positioned such that the shank 18 extends through the second member 14. The nut 50 is then threaded onto the first portion 52 of the shank 18 for securing the second member 14 relative to the first member 12. In alternative configurations, only one or more protrusions 46 and 74 are provided on the head 24 or one or more bumps 48 and 76 are provided on the plate 28.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A fastener assembly for fastening a first member to a second member, said assembly comprising:
   a stud which includes a shank having a first and a second end, a head extending from said first end of said shank, said head defining a surface which is disposed adjacent to said first end of said shank; and
   a plate having a first and a second face, said plate defining a non-circular slot for the reception therein of said head of said stud such that when said head is inserted through said slot and is rotated relative to said plate, said first face of said plate slidably cooperates with said surface of said head;
   wherein at least one of said surface of said head and said first face of said plate includes a performed interference member such that when said head is inserted into said slot and is rotated relative to said plate, said interference member engagingly cooperates with the other of said surface of said head and said first face of said plate during the rotation to secure said stud to said plate, thereby enabling the first number to be attached to the second member.

2. A fastener assembly as set forth in claim 1, wherein said surface of said head has a protrusion which is disposed between said head and said first face of said plate when said head is inserted through said slot, and said first face of said plate has a bump thereon which cooperates with said protrusion when said head is inserted into said slot and is rotated relative to said plate, the arrangement being such that when said head has been rotated relative to said plate, said protrusion and said bump interact with each other for locking said stud relative to said plate.

3. A fastener assembly as set forth in claim 2, wherein said protrusion is of a half-moon shaped configuration having a ramped surface and a flat, vertical surface, such that when said head is rotated relative to said plate, said ramped surface assists in allowing the protrusion to pass over said bump, and, once so passed, said flat, vertical surface assists in ensuring said stud remains desirably locked to said plate.

4. A fastener assembly as set forth in claim 2, wherein said surface defines a further protrusion disposed on an opposite side of said shank relative to said protrusion, and said face defines a further bump disposed on an opposite side of said slot relative to said bump so that when said head is rotated within said slot, said further protrusion and said further bump interact for assisting locking of said head relative to said plate.

5. A fastener assembly as set forth in claim 1, wherein said shank includes an externally threaded first portion, said first portion extending from said surface of said head, and a second portion extending from said first portion such that said first portion is disposed between said second portion and said surface of said head, said second portion defining a hexagonal configuration such that when said head is inserted within said slot, rotation of said head is facilitated by the provision of said hexagonal configuration of said second portion.

6. A fastener assembly as set forth in claim 5, wherein said hexagonal configuration is disposed externally.

7. A fastener assembly as set forth in claim 5, wherein said hexagonal configuration is disposed internally.

8. A fastener assembly as set forth in claim 1, wherein said head includes a rectangular shaped portion and a further surface being of dome shaped configuration, said slot has a first extremity, a second extremity, a first side and a second side, and said plate includes a bridge having a first and a second side, said first side of said bridge extending from said first extremity of said slot, said second side of said bridge extending from said second extremity of said slot, said bridge being of a dome shaped configuration for the rotatable reception therein of said dome shaped surface of said head.

9. A fastener assembly as set forth in claim 8, wherein one of said dome shaped surface of said head and said bridge includes a dimple, and the other of said dome shaped surface of said head and said bridge includes an indent, such that when said head is inserted into said slot with said further surface of said head cooperating with said dome shaped configuration of said bridge, said dimple is located within said indent for locating said head relative to said plate.

10. A fastener assembly as set forth in claim 9, wherein said dome shaped surface of said head includes said dimple and said dimple is disposed coaxially relative to a rotational axis of said head.

11. A fastener assembly as set forth in claim 8, wherein said plate further includes a first stop which extends from said first side of said slot for limiting rotation of said head within said slot, and a second stop which extends from said second side of said slot for limiting rotation of said head within said slot, said first stop being disposed adjacent to said second extremity of said slot, said second stop being disposed adjacent to said first extremity of said slot.

12. A fastener assembly for fastening a first member to a second member, said assembly comprising:
   a stud which includes a shank having a first and a second end, a head extending from said first end of said shank, said head defining a surface which is disposed adjacent to said first end of said shank, and a dimple extending centrally from said head; and
   a plate having a first and a second face, said plate defining a non-circular slot for the reception therein of said head of said stud such that when said head is inserted through said slot and is rotated relative to said plate, said first face of said plate slidably cooperates with said surface of said head, said plate including an indent for the rotatable reception therein of said dimple such that when said head is rotated within said slot, said dimple and said indent cooperate with each other for locating said head relative to said slot;
   wherein at least one of said surface of said head and said first face of said plate includes a performed interference member such that when said head is inserted into said slot and is rotated relative to said plate, said interference member cooperates with the other of said surface of said head and said first face of said plate during the rotation to secure said stud to said plate, thereby enabling the first member to be attached to the second member.

13. A fastener assembly as set forth in claim 12, wherein said surface of said head has a protrusion which is disposed between said head and said first face of said plate when said head is inserted through said slot, and said first face of said plate has a bump thereon which cooperates with said protrusion when said head is inserted into said slot and is rotated relative to said plate, the arrangement being such that when said head has been rotated relative to said plate, said protrusion and said bump interact with each other for locking said stud relative to said plate.

14. A fastener assembly as set forth in claim 13, wherein said surface defines a further protrusion disposed on an opposite side of said shank relative to said protrusion, and said face defines a further bump disposed on an opposite side of said slot relative to said bump so that when said head is rotated within said slot, said further protrusion and said further bump interact for assisting locking of said head relative to said plate, and wherein said protrusion and said further protrusion are each of a half-moon shaped configuration each having a ramped surface and a flat, vertical surface, such that when said head is rotated relative to said plate, said ramped surfaces assist in allowing the associated protrusions to pass over the associated bumps, and, once so passed, said flat, vertical surfaces assist in ensuring said stud remains desirably locked to said plate.

15. A fastener assembly as set forth in claim 12, wherein said shank includes an externally threaded first portion, said first portion extending from said surface of said head, and a second portion extending from said first portion such that said first portion is disposed between said second portion and said surface of said head, said second portion defining a hexagonal configuration such that when said head is inserted within said slot, rotation of said head is facilitated by the provision of said hexagonal configuration of said second portion.

16. A fastener assembly as set forth in claim 12, wherein said head includes a rectangular shaped portion and a further surface being of dome shaped configuration, said slot has a first extremity, a second extremity, a first side and a second side, and said plate includes a bridge having a first and a second side, said first side of said bridge extending from said first extremity of said slot, said second side of said bridge extending from said second extremity of said slot, said bridge being of a dome shaped configuration for the rotatable reception therein of said dome shaped surface of said head.

17. A fastener assembly as set forth in claim 16, wherein said plate further includes a first stop which extends from said first side of said slot for limiting rotation of said head within said slot, and a second stop which extends from said second side of said slot for limiting rotation of said head within said slot, said first stop being disposed adjacent to said second extremity of said slot, said second stop being disposed adjacent to said first extremity of said slot.

18. A fastener assembly for fastening a first member to a second member, said assembly comprising:
   a stud which includes a shank having a first and a second end, a head extending from said first end of said shank, said head defining a surface which is disposed adjacent to said first end of said shank; and
   a plate having a first and a second face, said plate defining a non-circular slot for the reception therein of said head of said stud such that when said head is inserted through said slot and is rotated relative to said plate, said first face of said plate slidably cooperates with said surface of said head;
   wherein said shank includes a first portion, said first portion extending from said surface of said head, and a second portion extending from said first portion such that said first portion is disposed between said second portion and said surface of said head, said second portion defining a surface adapted for cooperation with a tool for the rotation thereof such that when said head is inserted within said slot, rotation of said head is facilitated by the cooperation between said surface of said second portion and the tool;
   wherein at least one of said head and said plate includes a dimple and the other of said head and said plate includes an indent for the rotatable reception therein of said dimple such that when said head is rotated within said slot, said dimple and said indent cooperate with each other for locating said head relative to said slot; and
   wherein at least one of said surface of said head and said first face of said plate includes an interference member such that when said head is inserted into said slot and is rotated relative to said plate, said interference member engagingly cooperates with the other of said surface of said head and said first face of said plate during the rotation to secure said stud to said plate, thereby enabling the first member to be attached to the second member.

19. A fastener assembly as set forth in claim 18, wherein said surface of said head has a protrusion which is disposed between said head and said first face of said plate when said head is inserted through said slot, said surface defining a further protrusion disposed on an opposite side of said shank relative to said protrusion, said first face of said plate has a bump thereon which cooperates with said protrusion when said head is inserted into said slot and is rotated relative to said plate, and said face defining a further bump disposed on an opposite side of said slot relative to said bump which cooperates with said further protrusion when said head is inserted into said slot and is rotated relative to said plate, the arrangement being such that when said head has been rotated relative to said plate, said protrusion and said bump interact with each other, and said further protrusion and said further bump interact with each other, thereby locking said stud relative to said plate, and wherein said protrusion and said further protrusion are each of a half-moon shaped configuration each having a ramped surface and a flat, vertical surface, such that when said head is rotated relative to said plate, said ramped surfaces assist in allowing the associated protrusions to pass over the associated bumps, and, once so passed, said flat, vertical surfaces assist in ensuring said stud remains desirably locked to said plate.

20. A fastener assembly as set forth in claim 18, wherein said head includes a rectangular shaped portion and a further surface being of dome shaped configuration, said slot has a first extremity, a second extremity, a first side and a second side, and said plate includes a bridge having a first and a second side, said first side of said bridge extending from said first extremity of said slot, said second side of said bridge extending from said second extremity of said slot, said bridge being of a dome shaped configuration for the rotatable reception therein of said dome shaped surface of said head, and wherein said dome shaped surface of said head includes said dimple and said dimple is disposed coaxially relative to a rotational axis of said head.

* * * * *